(12) United States Patent
Tang et al.

(10) Patent No.: US 12,374,765 B2
(45) Date of Patent: Jul. 29, 2025

(54) LOWER PLASTIC MEMBER AND POWER BATTERY

(71) Applicant: Hithium Tech HK Limited, HongKong (CN)

(72) Inventors: Yang Tang, Fujian (CN); Wancai Zhang, Fujian (CN); Nan Zhang, Fujian (CN); Weidong Xu, Fujian (CN)

(73) Assignee: Hithium Tech HK Limited, Hongkong (CN)

( * ) Notice: Subject to any disclaimer, the term of this patent is extended or adjusted under 35 U.S.C. 154(b) by 507 days.

(21) Appl. No.: 17/962,554

(22) Filed: Oct. 10, 2022

(65) Prior Publication Data
US 2023/0032002 A1    Feb. 2, 2023

Related U.S. Application Data

(63) Continuation of application No. PCT/CN2021/096118, filed on May 26, 2021.

(30) Foreign Application Priority Data

Dec. 10, 2020  (CN) .......................... 202022966040.5

(51) Int. Cl.
*H01M 50/627* (2021.01)
*H01M 50/14* (2021.01)
(Continued)

(52) U.S. Cl.
CPC ......... *H01M 50/627* (2021.01); *H01M 50/14* (2021.01); *H01M 50/15* (2021.01);
(Continued)

(58) Field of Classification Search
CPC ............ H01M 50/627; H01M 50/636; H01M 50/655; H01M 50/586; H01M 50/588;
(Continued)

(56) References Cited

U.S. PATENT DOCUMENTS 6,573,000 B1 * 6/2003 Miyazaki ............ H01M 50/169
429/173
10,476,047 B2 * 11/2019 Feigl .................... H01M 50/169
(Continued)

FOREIGN PATENT DOCUMENTS

CN     207800666 U     8/2018
CN     207938663 U     10/2018
(Continued)

OTHER PUBLICATIONS

Extended European Search Report from corresponding European Application No. EP21901958.5, dated Nov. 14, 2024.
(Continued)

*Primary Examiner* — Raymond Alejandro

(57) ABSTRACT

Provided are a lower plastic member and a power battery. The lower plastic member includes a body protruding towards a jelly roll of the power battery to form a protruding portion. The protruding portion has at least one ventilation channel defined thereon. A gas in the power battery flows outside through the ventilation channel. The body has a liquid injection hole and a flow guide shroud provided thereon. The flow guide shroud is arranged at an opening on a side of the liquid injection hole facing towards the jelly roll. The flow guide shroud includes a shielding plate and a plurality of connection posts. The shielding plate has an inclined surface facing towards the body and inclined towards a side away from the body in a radially outward direction of the shielding plate.

20 Claims, 3 Drawing Sheets

(51) Int. Cl.
  *H01M 50/15* (2021.01)
  *H01M 50/325* (2021.01)
  *H01M 50/586* (2021.01)
  *H01M 50/593* (2021.01)
(52) U.S. Cl.
  CPC ....... *H01M 50/325* (2021.01); *H01M 50/586* (2021.01); *H01M 50/593* (2021.01); *H01M 2200/20* (2013.01)
(58) Field of Classification Search
  CPC ...... H01M 50/59; H01M 50/14; H01M 50/15; H01M 50/152; H01M 50/325; H01M 50/593; H01M 2200/20
  See application file for complete search history.

(56) References Cited

U.S. PATENT DOCUMENTS

| | | | |
|---|---|---|---|
| 2006/0099494 A1* | 5/2006 | Jung | H01M 50/15 429/174 |
| 2019/0237742 A1 | 8/2019 | Takabayashi et al. | |

FOREIGN PATENT DOCUMENTS

| | | |
|---|---|---|
| CN | 208225926 U | 12/2018 |
| CN | 208225927 U | 12/2018 |
| CN | 208225972 U | 12/2018 |
| CN | 208848999 U | 5/2019 |
| CN | 209785988 U | 12/2019 |
| JP | 2004119301 A | 4/2004 |

OTHER PUBLICATIONS

International Search Report dated Sep. 8, 2021 in International Application No. PCT/CN2021/096118. English translation attached.

* cited by examiner

LOWER PLASTIC MEMBER AND POWER BATTERY

CROSS-REFERENCE TO RELATED APPLICATIONS

This application is a continuation of International Application No. PCT/CN2021/096118, filed on May 26, 2021, which claims priority to Chinese Patent Application No. 202022966040.5 filed on Dec. 10, 2020, the entire disclosure of which is incorporated herein by reference.

FIELD

The present disclosure relates to the technical field of secondary batteries, and in particular, to lower plastic members and power batteries.

BACKGROUND

A power battery generally includes a top cover, a jelly roll, a housing, and a top cover lower plastic member. The jelly roll is fixed within the housing, and an electrode plate protruding from a top end of a cell is connected to a terminal fixed on the top cover. The top cover lower plastic member is mounted below a top cover body to insulate the top cover body from the cell.

The existing top cover lower plastic structure usually acts directly between the top cover body and the jelly roll, resulting in a direct greater contact area between the lower plastic member and the jelly roll, which is prone to collision and friction and cause damage to the jelly roll. The jelly roll is directly attached to an explosion-proof valve hole on the lower plastic member, so that a gas pressure inside the cell cannot be exhausted in time when the gas pressure rises rapidly, which results in a threat to safety of the jelly roll.

SUMMARY

The present disclosure aims to solve at least one of the technical problems existing in the related art. Embodiments of the present disclosure provide a lower plastic member for a power battery, which has the advantages of simple structure and good safety.

Embodiments of the present disclosure also provide a power battery having the lower plastic member as described above.

The lower plastic member for the power battery according to embodiments of the present disclosure includes a body protruding towards a jelly roll of the power battery to form a protruding portion. The protruding portion has at least one ventilation channel defined thereon, and gas in the power battery flows outside through the at least one ventilation channel. The body has a liquid injection hole and a flow guide shroud provided thereon. The flow guide shroud is arranged at an opening on a side of the liquid injection hole facing towards the jelly roll. The flow guide shroud has a flow guide hole defined on and penetrating the flow guide shroud. An electrolyte flows into an interior of the power battery through the liquid injection hole, an interior space of the flow guide shroud, and the flow guide hole. The flow guide shroud includes a shielding plate opposite to and spaced apart from the liquid injection hole, and a plurality of connection posts connected between the body and the shielding plate and arranged at intervals in a circumferential direction of the shielding plate. The flow guide hole is defined between any two adjacent connection posts. The shielding plate has an inclined surface facing towards the body and inclined towards a side away from the body in a radially outward direction of the shielding plate.

In the lower plastic member for the power battery according to the embodiments of the present disclosure, by arranging the protruding portion and defining the at least one ventilation channel on the protruding portion, the gas in the accommodation cavity can flow out smoothly, so that the electrolyte can also be smoothly injected into the accommodation cavity. In addition, when the lower plastic member and a battery main body are assembled together, the protruding portion can be abutted against the jelly roll, thereby preventing the jelly roll from shaking. Thus, it is possible to avoid damage to the jelly roll or short circuit caused by the shaking of the jelly roll, thereby improving safety of the power battery.

In some embodiments, an opening of the at least one ventilation channel is defined on an end surface of a free end of the protruding portion; or the opening of the at least one ventilation channel is defined on a side wall surface of the protruding portion.

In some embodiments, the at least one ventilation channel includes a plurality of ventilation channels arranged at intervals in an array.

In some embodiments, the protruding portion has a groove defined thereon, and the at least one ventilation channel is in communication with the interior of the power battery through the groove.

In some embodiments, the groove is open to the jelly roll of the power battery.

In some embodiments, the groove penetrates two opposite side surfaces of the protruding portion.

In some embodiments, the at least one ventilation channel includes at least one first through hole penetrating a bottom wall of the groove, and the gas in the power battery flows outside through the groove and the at least one first through hole.

In some embodiments, the at least one ventilation channel further includes a second through hole having an end located on an outer side wall surface of the groove and another end located on an inner side wall surface of the groove.

In some embodiments, a plurality of first through holes in a shape of an oblong racetrack is provided. The plurality of first through holes is arranged at intervals in such a manner that one is surrounded by another in an order from small to large in size.

In some embodiments, the body has an accommodation groove defined on a side thereof away from the protruding portion, and the accommodation groove is configured to accommodate an explosion-proof valve. The at least one ventilation channel has one end in communication with the accommodation groove and another end in communication with the interior of the power battery.

In some embodiments, the body has a plurality of flow guide channels arranged thereon in an array and spaced apart from each other.

In some embodiments, the body has a plurality of bosses arranged on a side surface thereof facing towards the jelly roll and spaced apart from each other.

In some embodiments, each of the plurality of bosses is in an elongated shape, and the boss is located at and extends along an edge of the body.

In some embodiments, the lower plastic member has a liquid injection hole and a flow guide shroud provided thereon. The flow guide shroud is arranged at an opening of a side of the liquid injection hole facing towards the jelly roll, and has a flow guide hole defined thereon. The flow guide hole penetrates the flow guide shroud. An electrolyte flows into the interior of the power battery through the liquid injection hole, an interior space of the flow guide shroud, and the flow guide hole.

In some embodiments, the flow guide shroud includes a shielding plate opposite to and spaced apart from the liquid injection hole, and a plurality of connection posts connected between the body and the shielding plate. The plurality of connection posts is arranged at intervals in a circumferential direction of the shielding plate. The flow guide hole is defined between any two adjacent connection posts.

A power battery according to embodiments of the present disclosure includes the lower plastic member for the power battery as described above.

In the power battery according to the embodiments of the present disclosure, by arranging the protruding portion and defining the at least one ventilation channel on the protruding portion, the gas in the accommodation cavity can flow out smoothly, so that the electrolyte can also be smoothly injected into the accommodation cavity. In addition, when the lower plastic member and the battery main body are assembled together, the protruding portion can be abutted against the jelly roll, thereby preventing the jelly roll from shaking. Thus, it is possible to avoid damage to the jelly roll or short circuit caused by the shaking of the jelly roll, thereby improving safety of the power battery.

BRIEF DESCRIPTION OF DRAWINGS

The above and/or additional aspects and advantages of the present disclosure will become apparent and readily understood from the following description of embodiments taken in conjunction with the accompanying drawings, in which.

Figure 1:
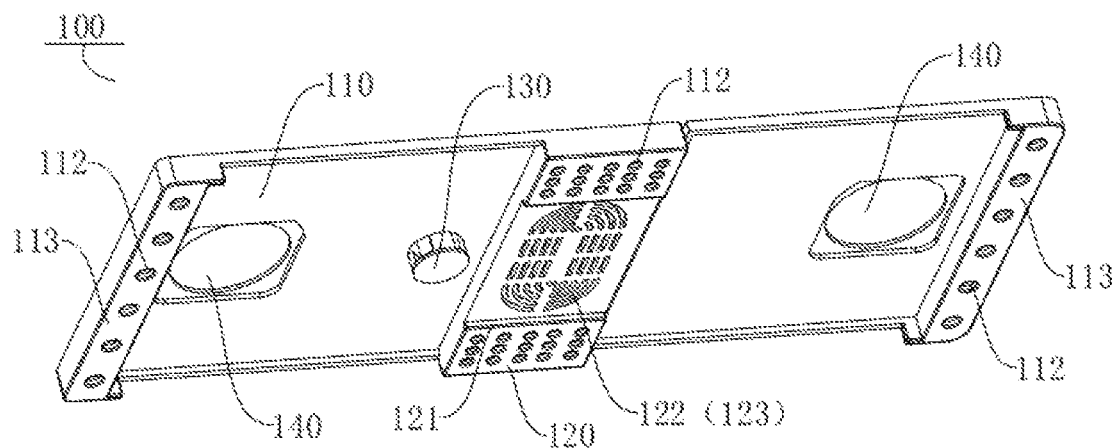
FIG. 1 is a perspective view of a lower plastic member for a power battery according to an embodiment of the present disclosure.

REFERENCE SIGNS lower plastic member 100,
body 110, accommodation groove 111, flow guide channel 112, boss 113,
protruding portion 120, groove 121, ventilation channel 122, first through hole 123, second through hole 124, flow guide shroud 130, shielding plate 131, connection post 132, flow guide hole 133;
electrode hole 140, liquid injection hole 150,
power battery 200, battery main body 210, shroud plate 220.

DESCRIPTION OF EMBODIMENTS

The embodiments of the present disclosure are described in detail below. Examples of the embodiments are shown in the accompanying drawings, in which the same or similar reference numerals indicate the same or similar elements or elements with the same or similar functions. The embodiments described below with reference to the accompanying drawings are exemplary, and are intended to explain the present disclosure, rather than being construed as limitations to the present disclosure.

In the description of the present disclosure, it should be understood that the orientation or position relationship indicated by the terms "center," "upper," "lower," "front," "rear," "left," "right," "vertical," "horizontal," "top," "bottom," "inner," and "outer," etc. is based on the orientation or position relationship shown in the drawings, and is only for the convenience of describing the present disclosure and simplifying the description, rather than indicating or implying that the associated device or element must have a specific orientation, or be constructed and operated in a specific orientation, and therefore cannot be understood as limitations to the present disclosure.

It should be noted that the terms "first" and "second" are only used for descriptive purposes, and cannot be understood as indicating or implying relative importance or implicitly indicating the number of indicated technical features. Therefore, the features associated with "first" and "second" may explicitly or implicitly include at least one of the features. Further, in the description of the present disclosure, unless otherwise specified, "a plurality of" means two or more.

A lower plastic member 100 for a power battery 200 and the power battery 200 according to embodiments of the present disclosure will be described in detail below with reference to FIGS. 1 to 4. It should be noted that the power battery 200 includes a jelly roll, a battery main body 210, a shroud plate 220, and a lower plastic member 100. The battery main body 210 has an accommodation cavity defined therein, and the jelly roll is located within the accommodation cavity. An upper end of the battery main body 210 is an open end. The shroud plate 220 and the lower plastic member 100 are laminated together, and the shroud plate 220 and the lower plastic member 100 are arranged at the open end of the battery main body 210 to block the open end. As shown in FIG. 4, the shroud plate 220 is located on a side of the lower plastic member 100 away from the accommodation cavity.

As shown in FIG. 1, the lower plastic member 100 includes a body 110 having a substantially rectangular plate. The body 110 protrudes towards a jelly roll of the power battery 200 to form a protruding portion 120 located at a middle position of the body 110. The protruding portion 120 has at least one ventilation channel 122 defined thereon, and a gas in the power battery 200 flows outside through the at least one ventilation channel 122. It should be noted that when an electrolyte is injected into the accommodation cavity, in order to allow the electrolyte to flow into the accommodation cavity smoothly, the gas in the accommodation cavity needs to be discharged. By arranging the at least one ventilation channel 122, the gas in the accommodation cavity can smoothly flow out, so that the electrolyte can also be smoothly injected into the accommodation cavity. When the lower plastic member 100 and the battery main body 210 are assembled together, in order to prevent the jelly roll from shaking in the accommodation cavity, the protruding portion 120 can be abutted against the jelly roll. As shown in FIG. 1, the body 110 has an electrode hole 140 defined thereon, and a terminal electrically connected to the jelly roll passes through the electrode hole 140.

Figure 2:
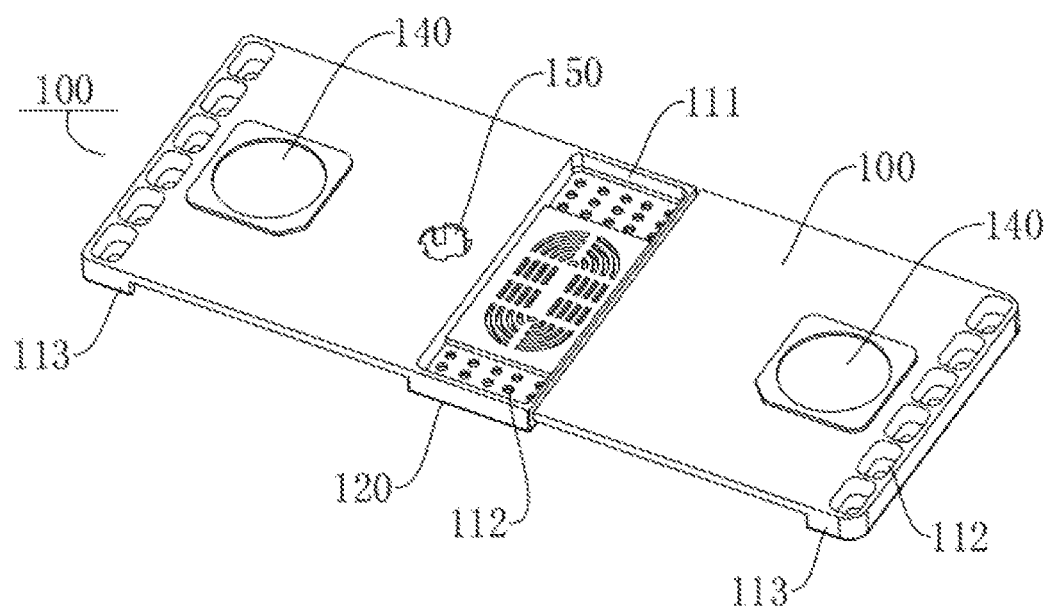
FIG. 2 is a perspective view of a lower plastic member for a power battery according to an embodiment of the present disclosure.
Figure 3:
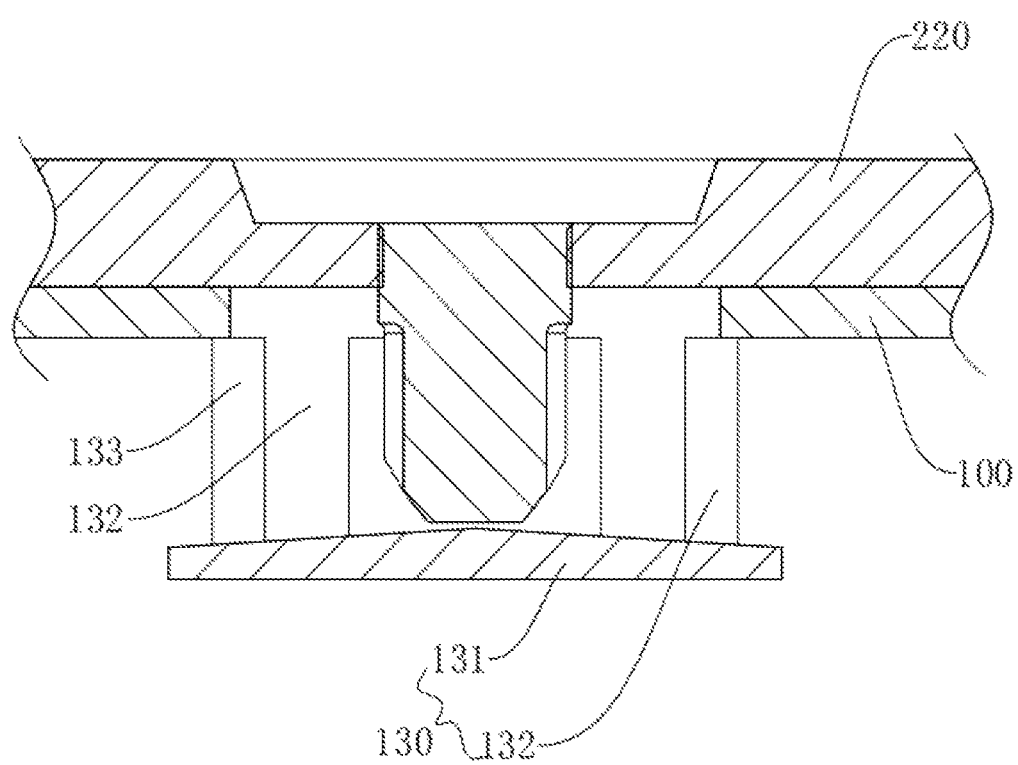
FIG. 3 is a cross-sectional view of a partial structure of a lower plastic member for a power battery according to an embodiment of the present disclosure.
Figure 4:
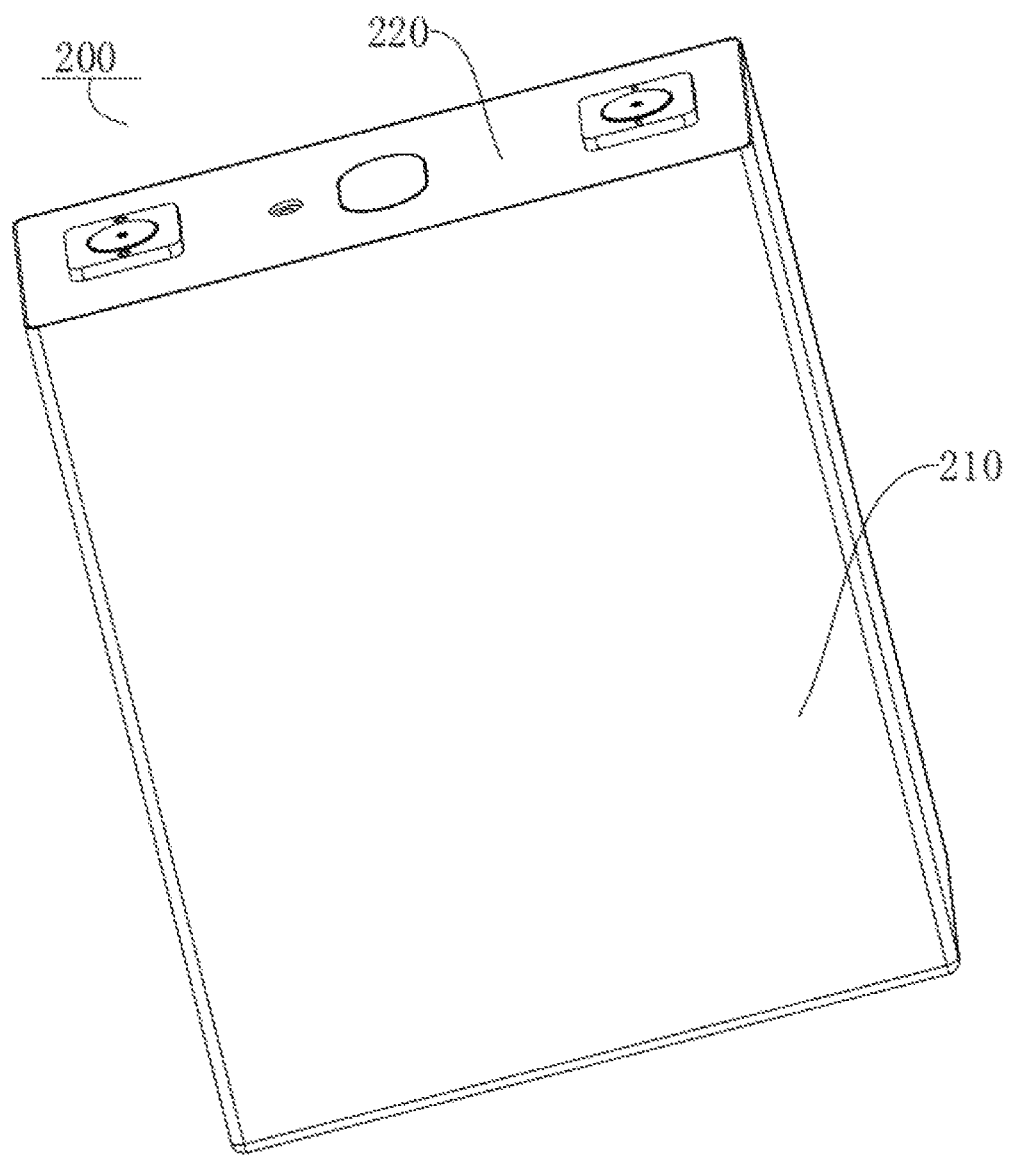
FIG. 4 is a perspective view of a power battery according to an embodiment of the present disclosure.

As shown in FIG. 2 and FIG. 3, according to some embodiments of the present disclosure, the lower plastic member 100 has a liquid injection hole 150 and a flow guide shroud 130 provided thereon. The flow guide shroud 130 is arranged at an opening on a side of the liquid injection hole 150 facing towards the jelly roll. The flow guide shroud 130 has a flow guide hole 133 defined thereon, and the flow guide hole 133 penetrates the flow guide shroud 130. The electrolyte flows into an interior of the power battery 200 through the liquid injection hole 150, an interior space of the flow guide shroud 130, and the flow guide hole 133. It should be noted that, since the electrolyte has a predetermined impact force when a liquid injection apparatus injects a liquid into the accommodation cavity, in order to prevent the electrolyte from impacting the jelly roll, the flow guide shroud 130 may be arranged at the liquid injection hole 150, so that the flow guide shroud 130 can provide a buffer function.

Further, as shown in FIG. 3, the flow guide shroud 130 may include a shielding plate 131 and a plurality of connection posts 132. The shielding plate 131 is opposite to and spaced apart from the liquid injection hole 150. In this way, when the electrolyte is injected, the electrolyte first flows to the shielding plate 131 and then change its flow direction when hitting the shielding plate 131, thereby preventing the electrolyte directly impacting onto the jelly roll. In order to facilitate an installation of the shielding plate 131, a plurality of connection posts 132 may also be arranged between the body 110 and the shielding plate 131.

The plurality of connection posts 132 is arranged at intervals in a circumferential direction of the shielding plate 131. The flow guide hole 133 is defined between any two adjacent connection posts 132.

As shown in FIG. 3, the shielding plate 131 has an inclined surface facing towards the body 110 and inclined towards a side away from the body 110 in a radially outward direction of the shielding plate 131. Therefore, the electrolyte can be guided by the inclined surface to be fully injected into the power battery. Meanwhile, the inclined surface can also buffer the electrolyte, and reduce a flow rate of the electrolyte, thereby preventing the electrolyte from impacting onto the jelly roll.

In the lower plastic member 100 for the power battery 200 according to the embodiments of the present disclosure, by arranging the protruding portion 120 and defining the at least one ventilation channel 122 on the protruding portion 120, the gas in the accommodation cavity can flow out smoothly, so that the electrolyte can also be smoothly injected into the accommodation cavity. In addition, when the lower plastic member 100 and the battery main body 210 are assembled together, the protruding portion 120 can be abutted against the jelly roll, thereby preventing the jelly roll from shaking. Therefore, it is possible to avoid damage to the jelly roll or short circuit caused by the shaking of the jelly roll, thereby improving safety of the power battery 200.

According to some embodiments of the present disclosure, an opening of the at least one ventilation channel 122 is defined on an end surface of a free end of the protruding portion 120. Therefore, it is not only convenient to define the at least one ventilation channel 122 on the protruding portion 120, but also facilitate a discharge of the gas in the accommodation cavity. It should be noted that the end face of the free end of the protruding portion is opposite to the jelly roll. When the electrolyte injected into the accommodation cavity gradually increases, a buoyant force on the jelly roll will increase, and thus there is a possibility that the jelly roll is abutted against the protruding portion and block the at least one ventilation channel when the electrolyte has not yet filled the accommodation cavity, which in turn results in insufficient electrolyte filling. In order to prevent the jelly roll from blocking the at least one ventilation channel 122, in some embodiments, the opening of the at least one ventilation channel 122 may also be defined on a side wall surface of the protruding portion 120.

As shown in FIGS. 1 and 2, according to some embodiments of the present disclosure, the at least one ventilation channel 122 includes a plurality of ventilation channels 122 arranged at intervals in an array. It should be noted that even if some of the plurality of ventilation channels 122 are blocked, the remaining ventilation channels 122 can smoothly discharge the gas, thereby ensuring that the accommodation cavity can be filled with the electrolyte.

According to some embodiments of the present disclosure, as shown in FIG. 1, the protruding portion 120 has a groove 121 defined thereon, and the ventilation channel 122 is in communication with the interior of the power battery 200 through the groove 121. Therefore, when the jelly roll is abutted against the protruding portion 120, the groove 121 can still be in communication with the accommodation cavity, so that the gas can enter the groove 121 and flow to an external space of the power battery 200 through the ventilation channels 122 in communication with the groove 121, so as to realize the function of exhaust.

In order to facilitate processing, in the example shown in FIG. 1, the groove 121 is open to the jelly roll of the power battery 200. Further, in order to communicate the groove 121 with the accommodation cavity, the groove 121 penetrates two opposite side surfaces of the protruding portion 120. That is, the groove 121 has an open structure on opposite side walls of the protruding portion 120, so that the gas in the accommodation cavity can enter the groove 121 through the open structure of the groove 121, thereby realizing the function of exhaust.

According to some embodiments of the present disclosure, the ventilation channel 122 may include at least one first through hole 123 penetrating a bottom wall of the groove 121, and the gas in the power battery 200 flows outside through the groove 121 and the at least one first through hole 123. That is, a part of the ventilation channel 122 may be defined on the bottom wall of the groove 121 and penetrates the bottom wall of the groove 121. In this way, an interior space of the groove 121 can be in communication with the outside through this part, thereby realize the purpose of exhaust.

Of course, in order to increase a gas discharging speed, the ventilation channel 122 also includes a second through hole 124 having one end located on an outer side wall surface of the groove 121 and another end located on an inner side wall surface of the groove 121. It should be understood that a part of the ventilation channel 122 is disposed on a side wall of the groove 121. In this way, when the jelly roll is abutted against the free end surface of the protruding portion 120, the jelly roll would not block the ventilation channel 122, and the gas in the accommodation cavity may still flow into the groove 121 through the second through hole 124 on the side wall of the groove 121, and then flows outside through the at least one first through hole 123.

According to some embodiments of the present disclosure, the at least one first through hole includes a plurality of first through holes 123 in a shape of an oblong racetrack. The plurality of first through holes 123 is arranged at intervals in such a manner that one is surrounded by another in an order from small to large in size. Thereby, areas of the first through holes 123 can be increased to allow the gas to be discharged smoothly.

In order to simplify a structure of the lower plastic member 100, as shown in FIG. 2, the body 110 has an accommodation groove 111 defined on a side thereof away from the protruding portion 120, and the accommodation groove 111 is configured to accommodate an explosion-proof valve. The ventilation channel 122 has one end in communication with the accommodation groove 111 and another end in communication with the interior of the power battery 200. It should be understood that the explosion-proof valve may be installed in the accommodation groove 111 by means of an embedded installation, which may not only arrange the explosion-proof valve closer to the accommodation cavity to allow a reaction of the explosion-proof valve to be more sensitive, but also reduce an assembling volume of the lower plastic member 100 and the explosion-proof valve, which further reduces an overall volume of the power battery 200 and optimizing the structure of the power battery 200. In order to further optimize the structure of the lower plastic member 100, in some embodiments, the body 110 has a plurality of flow guide channels 112 arranged thereon in an array and spaced apart from each other.

According to some embodiments of the present disclosure, as shown in FIG. 1, the body 110 has a plurality of bosses 113 arranged on a side surface thereof facing towards the jelly roll and spaced apart from each other. On the one hand, a structural strength of the lower plastic member 100 can be enhanced by the bosses 113. On the other hand, the bosses 113 may have a predetermined abutting effect against the jelly roll, thereby improving stability of the jelly roll. Further, as shown in FIG. 1, each of the bosses 113 is in an elongated shape, and the boss 113 is located at and extends along an edge of the body 110. Therefore, the structure of the lower plastic member 100 can be simplified, and the production efficiency of the lower plastic member 100 can be improved.

Throughout this specification, description with reference to "an embodiment," "some embodiments," "illustrative embodiments," "an example," "a specific example," or "some examples," means that a particular feature, structure, material, or characteristic described in connection with the embodiment or example is included in at least one embodiment or example of the present disclosure. In this specification, schematic representations of the above terms do not necessarily refer to the same embodiment or example. Furthermore, the particular features, structures, materials, or characteristics described herein may be combined in any suitable manner in one or more embodiments or examples.

Although embodiments of present disclosure have been shown and described above, it should be understood by those skilled in the art that changes, modifications, substitutions and alterations can be made to the embodiments without departing from the principle and spirit of the present disclosure. The scope of the present disclosure is defined by the appended claims and their equivalents.

What is claimed is:

1. A lower plastic member for a power battery, the lower plastic member comprising:
a body protruding towards a jelly roll of the power battery to form a protruding portion,
wherein the protruding portion has at least one ventilation channel defined thereon, wherein gas in the power battery flows outside through the at least one ventilation channel, wherein the body has a liquid injection hole and a flow guide shroud provided thereon, the flow guide shroud being arranged at an opening on a side of the liquid injection hole facing towards the jelly roll, wherein the flow guide shroud has a flow guide hole defined on and penetrating the flow guide shroud, wherein an electrolyte flows into an interior of the power battery through the liquid injection hole, an interior space of the flow guide shroud, and the flow guide hole; and
wherein the flow guide shroud comprises a shielding plate opposite to and spaced apart from the liquid injection hole, and a plurality of connection posts connected between the body and the shielding plate and arranged at intervals in a circumferential direction of the shielding plate, wherein the flow guide hole is defined between any two adjacent connection posts, and wherein the shielding plate has an inclined surface facing towards the body and inclined towards a side away from the body in a radially outward direction of the shielding plate.

2. The lower plastic member for the power battery according to claim 1,
wherein an opening of the at least one ventilation channel is defined on an end surface of a free end of the protruding portion; or
wherein the opening of the at least one ventilation channel is defined on a side wall surface of the protruding portion.

3. The lower plastic member for the power battery according to claim 1, wherein the at least one ventilation channel comprises a plurality of ventilation channels arranged at intervals in an array.

4. The lower plastic member for the power battery according to claim 1, wherein the protruding portion has a groove defined thereon, and wherein the at least one ventilation channel is in communication with the interior of the power battery through the groove.

5. The lower plastic member for the power battery according to claim 4, wherein the groove is open to the jelly roll of the power battery.

6. The lower plastic member for the power battery according to claim 5, wherein the groove penetrates two opposite side surfaces of the protruding portion.

7. The lower plastic member for the power battery according to claim 4, wherein the at least one ventilation channel comprises at least one first through hole penetrating a bottom wall of the groove, and wherein the gas in the power battery flow outside through the groove and the first through hole.

8. The lower plastic member for the power battery according to claim 7, wherein the at least one ventilation channel further comprises a second through hole having an end located on an outer side wall surface of the groove and another end located on an inner side wall surface of the groove.

9. The lower plastic member for the power battery according to claim 7, wherein a plurality of first through holes in a shape of an oblong racetrack is provided, the plurality of first through holes being arranged at intervals in such a manner that one is surrounded by another in an order from small to large in size.

10. The lower plastic member for the power battery according to claim 1, wherein the body has an accommodation groove defined on a side thereof away from the protruding portion, the accommodation groove being configured to accommodate an explosion-proof valve, and wherein the at least one ventilation channel has one end in communication with the accommodation groove and another end in communication with the interior of the power battery.

11. The lower plastic member for the power battery according to claim 1, wherein the body has a plurality of flow guide channels arranged thereon in an array and spaced apart from each other.

12. The lower plastic member for the power battery according to claim 1, wherein the body has a plurality of bosses arranged on a side surface thereof facing towards the jelly roll and spaced apart from each other.

13. The lower plastic member for the power battery according to claim 12, wherein each of the plurality of bosses is in an elongated shape, and wherein the boss is located at and extends along an edge of the body.

14. A power battery, comprising a lower plastic member, the lower plastic member comprising:
  a body protruding towards a jelly roll of the power battery to form a protruding portion,
  wherein the protruding portion has at least one ventilation channel defined thereon, wherein gas in the power battery flows outside through the at least one ventilation channel, wherein the body has a liquid injection hole and a flow guide shroud provided thereon, the flow guide shroud being arranged at an opening on a side of the liquid injection hole facing towards the jelly roll, wherein the flow guide shroud has a flow guide hole defined on and penetrating the flow guide shroud, wherein an electrolyte flows into an interior of the power battery through the liquid injection hole, an interior space of the flow guide shroud, and the flow guide hole; and
  wherein the flow guide shroud comprises a shielding plate opposite to and spaced apart from the liquid injection hole, and a plurality of connection posts connected between the body and the shielding plate and arranged at intervals in a circumferential direction of the shielding plate, wherein the flow guide hole is defined between any two adjacent connection posts, and wherein the shielding plate has an inclined surface facing towards the body and inclined towards a side away from the body in a radially outward direction of the shielding plate.

15. The power battery according to claim 14,
  wherein an opening of the at least one ventilation channel is defined on an end surface of a free end of the protruding portion; or
  wherein the opening of the at least one ventilation channel is defined on a side wall surface of the protruding portion.

16. The power battery according to claim 14, wherein the at least one ventilation channel comprises a plurality of ventilation channels arranged at intervals in an array.

17. The power battery according to claim 14, wherein the protruding portion has a groove defined thereon, and wherein the at least one ventilation channel is in communication with the interior of the power battery through the groove.

18. The power battery according to claim 17, wherein the groove is open to the jelly roll of the power battery.

19. The power battery according to claim 18, wherein the groove penetrates two opposite side surfaces of the protruding portion.

20. The power battery according to claim 17, wherein the at least one ventilation channel comprises at least one first through hole penetrating a bottom wall of the groove, and wherein the gas in the power battery flow outside through the groove and the first through hole.

* * * * *